US012719179B2

(12) United States Patent
Papantonis et al.

(10) Patent No.: US 12,719,179 B2
(45) Date of Patent: Aug. 25, 2026

(54) ELECTRONIC DEVICE WITH INTEGRATED HOUSING AND DISPLAY ANTENNA

(71) Applicant: Apple Inc., Cupertino, CA (US)

(72) Inventors: Dimitrios Papantonis, Cupertino, CA (US); Yuko N Kanagy, Sunnyvale, CA (US); Jiaxiao Niu, Shanghai (CN); Mario Martinis, Cupertino, CA (US); Andrea Ruaro, San Jose, CA (US); Jayesh Nath, Santa Clara, CA (US); Mattia Pascolini, San Francisco, CA (US); Eduardo Jorge Da Costa Bras Lima, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 565 days.

(21) Appl. No.: 18/324,827

(22) Filed: May 26, 2023

(65) Prior Publication Data

US 2023/0420868 A1 Dec. 28, 2023

Related U.S. Application Data

(60) Provisional application No. 63/355,026, filed on Jun. 23, 2022.

(51) Int. Cl.
*H01Q 21/06* (2006.01)
*H01Q 21/00* (2006.01)

(52) U.S. Cl.
CPC ....... *H01Q 21/064* (2013.01); *H01Q 21/0043* (2013.01)

(58) Field of Classification Search
CPC .......................... H01Q 21/064; H01Q 21/0043
See application file for complete search history.

(56) References Cited

U.S. PATENT DOCUMENTS

| | | | |
|---|---|---|---|
| 7,151,496 | B2 | 12/2006 | Casagrande et al. |
| 7,511,679 | B2 | 3/2009 | Araki et al. |
| 8,270,914 | B2 | 9/2012 | Pascolini et al. |
| 9,703,272 | B2 | 7/2017 | Fraser et al. |
| 9,786,981 | B2 | 10/2017 | Mahanfar et al. |
| 9,977,406 | B2 | 5/2018 | Fujisawa |

(Continued)

FOREIGN PATENT DOCUMENTS

| | | | |
|---|---|---|---|
| CN | 106154823 | A | 11/2016 |
| CN | 106785355 | A | 5/2017 |

(Continued)

*Primary Examiner* — Curtis B Odom
(74) *Attorney, Agent, or Firm* — Treyz Law Group, P.C.; Michael H. Lyons

(57) ABSTRACT

An electronic device may have conductive sidewalls, a conductive turret, and a conductive bridge. The turret may be separated from the sidewalls by a slot. A display may be mounted to the turret and may include conductive display structures and a conductive ring that couples the display to the turret. An antenna in the device may have a radiating element formed from the conductive display structures, the ring, and the turret. The conductive bridge may form a short path across the slot to the sidewalls. The slot may define radiating edges of the radiating element. Integrating the antenna into the device in this way may maximize the bandwidth of the antenna by extending the antenna area to include the entire lateral area of the electronic device. This may also serve to maximize the active area of the display.

20 Claims, 7 Drawing Sheets

(56) References Cited

U.S. PATENT DOCUMENTS

| | | | |
|---|---|---|---|
| 10,418,693 | B2 | 9/2019 | Xu et al. |
| 10,447,080 | B2 | 10/2019 | Jung et al. |
| 10,581,145 | B2 | 3/2020 | Han et al. |
| 10,644,383 | B2 | 5/2020 | Da Costa Bras Lima et al. |
| 11,050,463 | B2 | 6/2021 | Hiemstra et al. |
| 2014/0225786 | A1 | 8/2014 | Lyons et al. |
| 2015/0188217 | A1 | 7/2015 | Tsai et al. |
| 2019/0109367 | A1 | 4/2019 | Tseng et al. |
| 2024/0387984 | A1* | 11/2024 | Marin .................... G04R 60/06 |

FOREIGN PATENT DOCUMENTS

| | | | |
|---|---|---|---|
| EP | 3319170 | A1 | 5/2018 |
| EP | 4156409 | A1 | 3/2023 |
| KR | 20190013778 | A | 2/2019 |
| KR | 20200024301 | A | 3/2020 |
| WO | 2021231221 | A1 | 11/2021 |

* cited by examiner

ELECTRONIC DEVICE WITH INTEGRATED HOUSING AND DISPLAY ANTENNA

This application claims the benefit of U.S. Provisional Patent Application No. 63/355,026, filed Jun. 23, 2022, which is hereby incorporated by reference herein in its entirety.

BACKGROUND

This relates to electronic devices, and more particularly, to electronic devices with wireless circuitry.

Electronic devices are often provided with wireless communications capabilities. To satisfy consumer demand for small form factor electronic devices, manufacturers are continually striving to implement wireless circuitry such as antenna components using compact structures.

At the same time, larger antenna volumes generally allow antennas to exhibit greater efficiency bandwidth. In addition, because antennas have the potential to interfere with each other and with other components in a wireless device, care must be taken when incorporating antennas into an electronic device to ensure that the antennas and wireless circuitry are able to exhibit satisfactory performance over a wide range of operating frequencies.

It would therefore be desirable to be able to provide improved wireless circuitry for electronic devices.

SUMMARY

An electronic device such as a wristwatch may be provided with a housing. The housing may include conductive sidewalls, a conductive turret, and a conductive bridge. The conductive turret may be vertically separated from the conductive sidewalls by an elongated slot. The conductive bridge may couple the conductive turret to the conductive sidewalls across the elongated slot.

A display may be mounted to the conductive turret. The display may include conductive display structures and a display cover layer overlapping the conductive display structures. The conductive display structures may include conductive material on a display board. The display may include a conductive ring that couples the display board to the conductive turret. The conductive turret may laterally surround the display cover layer. A dielectric gasket may be vertically interposed between the display cover layer and the conductive ring.

The electronic device may include wireless circuitry. The wireless circuitry may include an antenna. The antenna may convey radio-frequency signals through a front face of the device. The antenna may have a radiating element and an antenna ground. The antenna ground may include the conductive sidewalls. The radiating element may be a shorted patch element. The shorted patch element may include a patch element formed from the conductive display structures, the conductive ring, and the conductive turret. The shorted patch element may be shorted to the conductive sidewalls by the conductive bridge. The slot may define radiating edges of the shorted patch element. Integrating the antenna into the device in this way may maximize the bandwidth of the antenna by extending the antenna area to include the entire lateral area of the electronic device. This may also serve to maximize the active area of the display.

DETAILED DESCRIPTION

Figure 1:
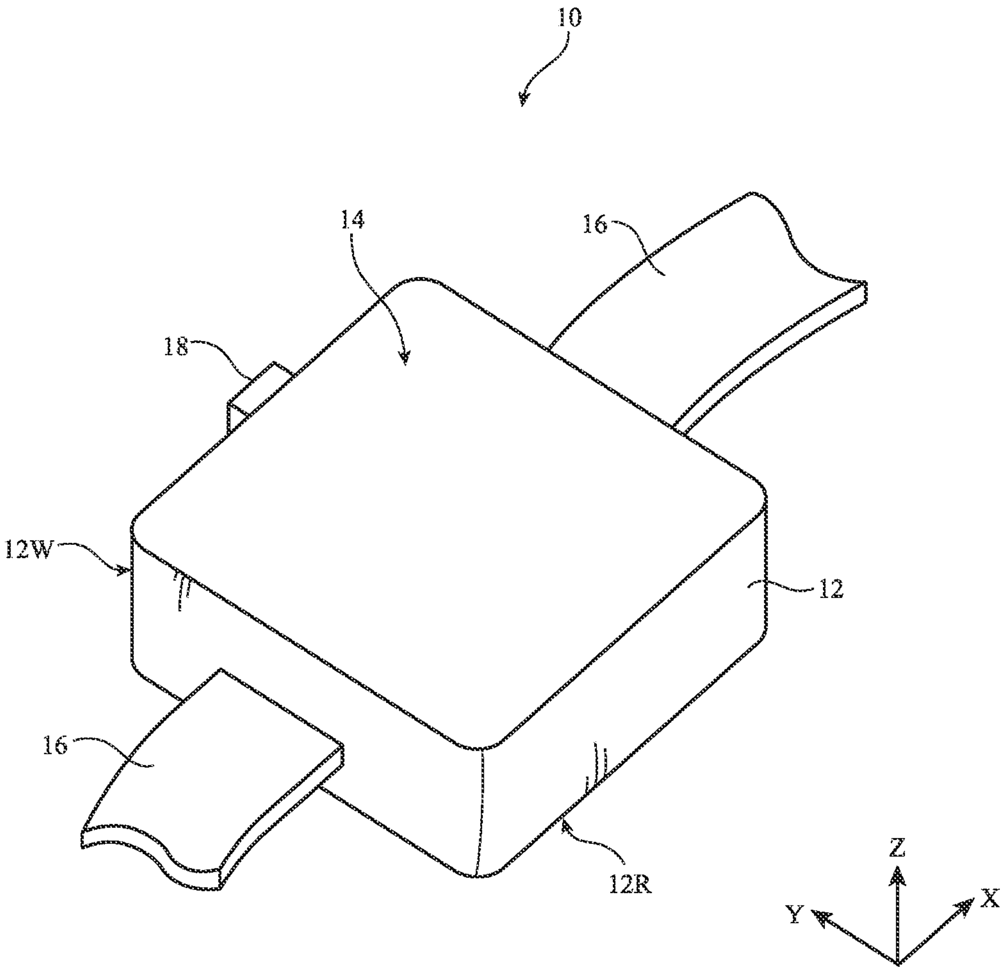
FIG. 1 is a perspective view of an illustrative electronic device with wireless circuitry in accordance with some embodiments.

Electronic devices such as electronic device 10 of FIG. 1 may be provided with wireless circuitry (sometimes referred to herein as wireless communications circuitry). The wireless circuitry may be used to support wireless communications in multiple wireless communications bands. Communications bands (sometimes referred to herein as frequency bands) handled by the wireless circuitry can include satellite navigation system communications bands, cellular telephone communications bands, wireless local area network communications bands, wireless personal area network communications bands, near-field communications bands, ultra-wideband communications bands, or other wireless communications bands.

The wireless circuitry may include one or more antennas. The antennas of the wireless circuitry can include patch antennas (e.g., shorted patch antennas), loop antennas, inverted-F antennas, strip antennas, planar inverted-F antennas, slot antennas, hybrid antennas that include antenna structures of more than one type, or other suitable antennas.

Electronic device 10 may be a computing device such as a laptop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a wristwatch (e.g., a smart watch). Other configurations may be used for device 10 if desired. The example of FIG. 1 is merely illustrative.

In the example of FIG. 1, device 10 includes a display such as display 14. Display 14 may be mounted in a housing such as housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have metal sidewalls such as sidewalls 12W or sidewalls formed from other materials. Examples of metal materials that may be used for forming sidewalls 12W include stainless steel, aluminum, silver, gold, metal alloys, or any other desired conductive material. Sidewalls 12W may sometimes be referred to herein as housing sidewalls 12W or conductive housing sidewalls 12W.

Display 14 may be formed at (e.g., mounted on) the front side (face) of device 10. Housing 12 may have a rear housing wall on the rear side (face) of device 10 such as rear housing wall 12R that opposes the front face of device 10. Conductive housing sidewalls 12W may surround the periphery of device 10 (e.g., conductive housing sidewalls 12W may extend around peripheral edges of device 10). Rear housing wall 12R may be formed from conductive materials and/or dielectric materials. Examples of dielectric materials that may be used for forming rear housing wall 12R include plastic, glass, sapphire, ceramic, wood, polymer, combinations of these materials, or any other desired dielectrics.

Rear housing wall 12R and/or display 14 may extend across some or all of the length (e.g., parallel to the X-axis of FIG. 1) and width (e.g., parallel to the Y-axis) of device 10. Conductive housing sidewalls 12W may extend across some or all of the height of device 10 (e.g., parallel to Z-axis). Conductive housing sidewalls 12W and/or rear housing wall 12R may form one or more exterior surfaces of device 10 (e.g., surfaces that are visible to a user of device 10) and/or may be implemented using internal structures that do not form exterior surfaces of device 10 (e.g., conductive or dielectric housing structures that are not visible to a user of device 10 such as conductive structures that are covered with layers such as thin cosmetic layers, protective coatings, and/or other coating layers that may include dielectric materials such as glass, ceramic, plastic, or other structures that form the exterior surfaces of device 10 and/or serve to hide housing walls 12R and/or 12W from view of the user).

If desired, housing 12 may include one or more dielectric-filled slots. The dielectric-filled slots, sometimes referred to herein as gaps, openings, or splits, may divide the conductive material in housing 12 into different conductive housing portions. The slots may be filled with dielectric material such as plastic, polymer, sapphire, glass, rubber, or ceramic. In one implementation that is described herein as an example, housing 12 may include a slot that extends along three of the four peripheral edges of device 10 and that separates conductive housing sidewalls 12W from a conductive upper portion of housing 12 (sometimes referred to herein as a conductive turret, conductive top portion, conductive ring, or conductive bezel of housing 12) along three sides of device 10. The slot may be used to separate a radiating element in an antenna of device 10 from ground structures in the antenna. This may allow the radiating element to conduct antenna currents along its edges (e.g., at the slot) that produces electric fields associated with the transmission and/or reception of radio-frequency signals.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. Display 14 may also be force sensitive and may gather force input data associated with how strongly a user or object is pressing against display 14.

Display 14 may include an array of display pixels formed from liquid crystal display (LCD) components, an array of electrophoretic display pixels, an array of plasma display pixels, an array of organic light-emitting diode (OLED) display pixels, an array of electrowetting display pixels, or display pixels based on other display technologies. Display 14 may be protected using a display cover layer. The display cover layer may be formed from a transparent material such as glass, plastic, sapphire or other crystalline dielectric materials, ceramic, or other clear materials. The display cover layer may extend across substantially all of the length and width of device 10, for example.

Device 10 may include buttons such as button 18. There may be any suitable number of buttons in device 10 (e.g., a single button, more than one button, two or more buttons, five or more buttons, etc.). Buttons may be located in openings in housing 12 (e.g., openings in conductive housing sidewall 12W or rear housing wall 12R) or in an opening in display 14 (as examples). Buttons may be rotary buttons, sliding buttons, buttons that are actuated by pressing on a movable button member, etc. Button members for buttons such as button 18 may be formed from metal, glass, plastic, or other materials. Button 18 may sometimes be referred to as a crown in scenarios where device 10 is a wristwatch device.

Device 10 may, if desired, be coupled to a strap such as strap 16. Strap 16 may be used to hold device 10 against a user's wrist (as an example). Strap 16 may sometimes be referred to herein as wrist strap 16. In the example of FIG. 1, wrist strap 16 is connected to opposing sides of device 10. Conductive housing sidewalls 12W may include attachment structures for securing wrist strap 16 to housing 12 (e.g., lugs or other attachment mechanisms that configure housing 12 to receive wrist strap 16). Wrist strap 16 may be removable if desired. Configurations that do not include straps may also be used for device 10.

Figure 2:
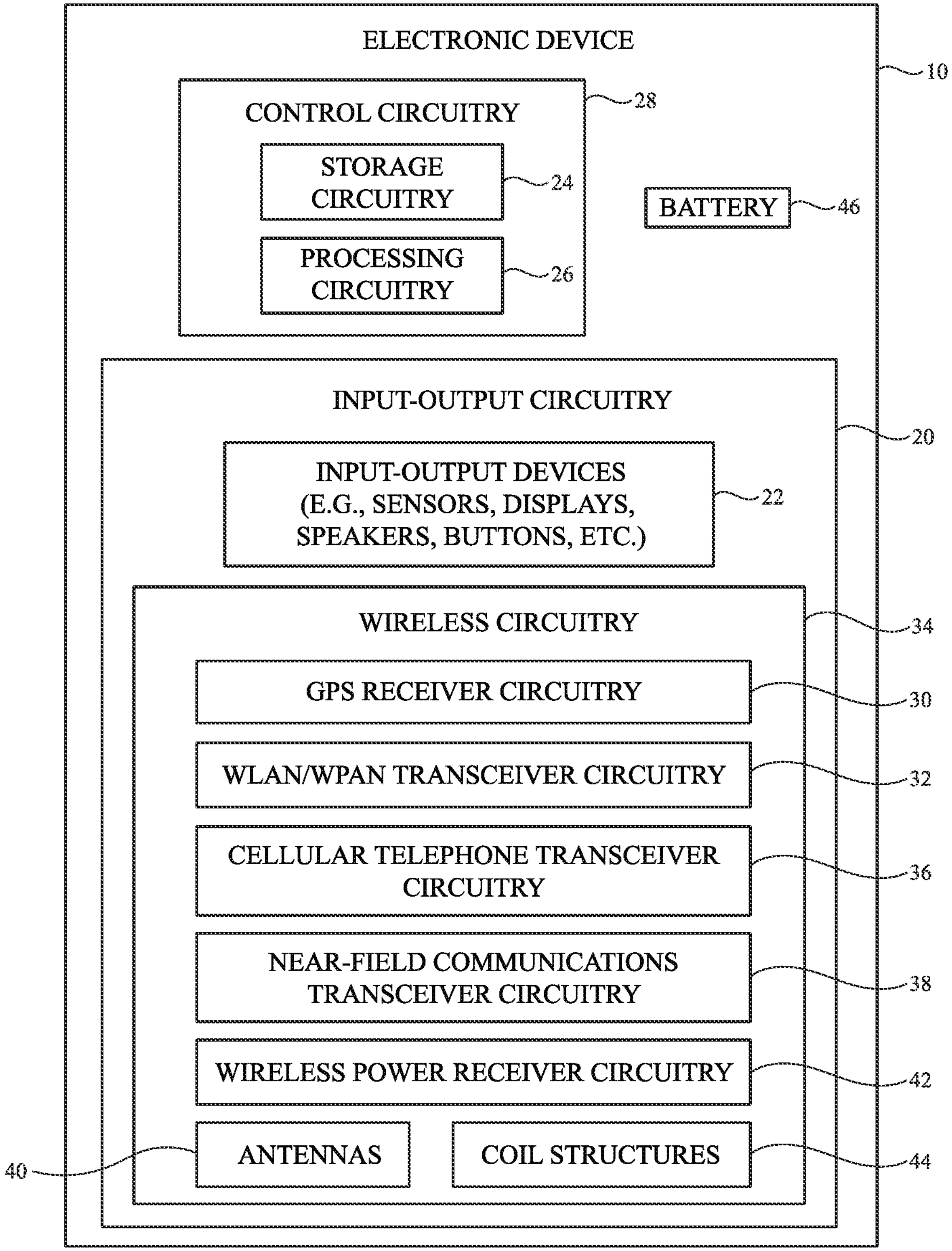
FIG. 2 is a schematic diagram of an illustrative electronic device with wireless circuitry in accordance with some embodiments.

A schematic diagram showing illustrative components that may be used in device 10 is shown in FIG. 2. As shown in FIG. 2, device 10 may include control circuitry 28. Control circuitry 28 may include storage such as storage circuitry 24. Storage circuitry 24 may include hard disk drive storage, nonvolatile memory (e.g., flash memory or other electrically-programmable-read-only memory configured to form a solid-state drive), volatile memory (e.g., static or dynamic random-access-memory), etc.

Control circuitry 28 may include processing circuitry such as processing circuitry 26. Processing circuitry 26 may be used to control the operation of device 10. Processing circuitry 26 may include on one or more microprocessors, microcontrollers, digital signal processors, host processors, baseband processor integrated circuits, application specific integrated circuits, central processing units (CPUs), graphics processing units, etc. Control circuitry 28 may be configured to perform operations in device 10 using hardware (e.g., dedicated hardware or circuitry), firmware, and/or software. Software code for performing operations in device 10 may be stored on storage circuitry 24 (e.g., storage circuitry 24 may include non-transitory (tangible) computer readable storage media that stores the software code). The software code may sometimes be referred to as program instructions, software, data, instructions, or code. Software code stored on storage circuitry 24 may be executed by processing circuitry 26.

Control circuitry 28 may be used to run software on device 10 such as external node location applications, satellite navigation applications, internet browsing applications, voice-over-internet-protocol (VOIP) telephone call applications, email applications, media playback applications, operating system functions, etc. To support interactions with external equipment, control circuitry 28 may be used in implementing communications protocols. Communications protocols that may be implemented using control circuitry 28 include internet protocols, wireless local area network protocols (e.g., IEEE 802.11 protocols—sometimes referred to as Wi-Fi®), protocols for other short-range wireless communications links such as the Bluetooth® protocol or other wireless personal area network (WPAN) protocols, IEEE 802.11ad protocols, cellular telephone protocols, MIMO protocols, antenna diversity protocols, satellite navigation system protocols (e.g., global positioning system (GPS) protocols, global navigation satellite system (GLONASS) protocols, etc.), IEEE 802.15.4 ultra-wideband communications protocols or other ultra-wideband communications protocols, etc. Each communications protocol may be associated with a corresponding radio access technology (RAT) that specifies the physical connection methodology used in implementing the protocol.

Device 10 may include input-output circuitry 20. Input-output circuitry 20 may include input-output devices 22. Input-output devices 22 may be used to allow data to be supplied to device 10 and to allow data to be provided from device 10 to external devices. Input-output devices 22 may include user interface devices, data port devices, and other input-output components. For example, input-output devices 22 may include touch screens, displays without touch sensor capabilities, buttons, scrolling wheels, touch pads, key pads, keyboards, microphones, cameras, buttons, speakers, status indicators, light sources, audio jacks and other audio port components, vibrators or other haptic feedback engines, digital data port devices, light sensors (e.g., infrared light sensors, visible light sensors, etc.), light-emitting diodes, motion sensors (accelerometers), capacitance sensors, proximity sensors, magnetic sensors, force sensors (e.g., force sensors coupled to a display to detect pressure applied to the display), etc.

Input-output circuitry 22 may include wireless circuitry 34. Wireless circuitry 34 may include wireless power receiving coil structures such as coil structures 44 and wireless power receiver circuitry such as wireless power receiver circuitry 42. Device 10 may use wireless power receiver circuitry 42 and coil structures 44 to receive wirelessly transmitted power (e.g., wireless charging signals) from a wireless power adapter (e.g., a wireless power transmitting device such as a wireless charging mat or other device). Coil structures 44 may include one or more inductive coils that use resonant inductive coupling (near field electromagnetic coupling) with a wireless power transmitting coil on the wireless power adapter.

The wireless power adapter may pass AC currents through the wireless power transmitting coil to produce a time varying electromagnetic (e.g., magnetic) field that is received as wireless power (wireless charging signals) by coil structures 44 in device 10. An illustrative frequency for the wireless charging signals is 200 kHz. Other frequencies may be used, if desired (e.g., frequencies in the kHz range, the MHz range, or in the GHz range, frequencies of 1 kHz to 1 MHz, frequencies of 1 kHz to 100 MHz, frequencies less than 100 MHz, frequencies less than 1 MHz, etc.). When the time varying electromagnetic field is received by coil structures 44, corresponding alternating-current (AC) currents are induced in the coil structures. Wireless power receiver circuitry 42 may include converter circuitry such as rectifier circuitry. The rectifier circuitry may include rectifying components such as synchronous rectification metal-oxide-semiconductor transistors arranged in a bridge network, and may convert these currents from coil structures 44 into a DC voltage for powering device 10. The DC voltage produced by the rectifier circuitry in wireless power receiver circuitry 42 can be used in powering (charging) an energy storage device such as battery 46 and can be used in powering other components in device 10.

To support wireless communications, wireless circuitry 34 may include baseband circuitry (e.g., one or more baseband processors or other circuitry that operates on baseband signals) and radio-frequency (RF) transceiver circuitry formed from one or more integrated circuits, power amplifier circuitry, low-noise input amplifiers, passive RF components, mixer circuitry, synthesizers, modulators, demodulators, upconverters, downconverters, etc. Wireless circuitry 34 may also include one or more antennas such as antennas 40, transmission lines, and other circuitry for handling RF wireless signals. One or more radio-frequency front end modules may be disposed along the transmission lines if desired. Wireless signals can also be sent using light (e.g., using infrared communications).

Wireless circuitry 34 may include radio-frequency transceiver circuitry for handling transmission and/or reception of radio-frequency signals within corresponding frequency bands at radio frequencies (sometimes referred to herein as communications bands or simply as "bands"). For example, wireless circuitry 34 may include wireless local area network (WLAN) and wireless personal area network (WPAN) transceiver circuitry 32. Transceiver circuitry 32 may handle a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz). Transceiver circuitry 32 may sometimes be referred to herein as WLAN/WPAN transceiver circuitry 32.

Wireless circuitry 34 may use cellular telephone transceiver circuitry 36 for handling wireless communications in frequency ranges (communications bands) such as a cellular low band (LB) from 600 to 960 MHz, a cellular low-midband (LMB) from 1410 to 1510 MHz, a cellular mid-band (MB) from 1710 to 2170 MHz, a cellular high band (HB) from 2300 to 2700 MHz, a cellular ultra-high band (UHB) from 3300 to 5000 MHz, or other communications bands between 600 MHz and 5000 MHz or other suitable frequencies, 2G bands, 3G bands, 4G LTE bands, 3GPP 5G New Radio Frequency Range 1 (FR1) bands below 10 GHz, 3GPP 5G New Radio (NR) Frequency Range 2 (FR2) bands between 20 and 60 GHz, or other centimeter or millimeter wave frequency bands between 10-300 GHz (as examples). Cellular telephone transceiver circuitry 36 may handle voice data and non-voice data.

Wireless circuitry 34 may include satellite navigation system circuitry such as Global Positioning System (GPS) receiver circuitry 30. GPS receiver circuitry 30 may receive GPS signals in satellite navigation frequency bands such as the Global Positioning System (GPS) L1 band (e.g., at 1575 MHz), L2 band (e.g., at 1228 MHz), L3 band (e.g., at 1381 MHz), L4 band (e.g., at 1380 MHz), and/or L5 band (e.g., at 1176 MHz), a Global Navigation Satellite System (GLONASS) band, a BeiDou Navigation Satellite System (BDS)

band, or other bands. Satellite navigation system signals for receiver circuitry 30 are received from a constellation of satellites orbiting the earth. Wireless circuitry 34 can include circuitry for other short-range and long-range wireless links if desired. For example, wireless circuitry 34 may include circuitry for receiving television and radio signals, paging system transceivers, near field communications (NFC) transceiver circuitry 38 (e.g., an NFC transceiver operating at 13.56 MHz or another suitable frequency), ultra-wideband transceiver circuitry (e.g., transceiver circuitry that operates at ultra-wideband (UWB) frequency bands under the IEEE 802.15.4 protocol and/or other ultra-wideband communications protocols (e.g., a first UWB communications band at 6.5 GHz and/or a second UWB communications band at 8.0 GHz)), transceiver circuitry that operates using communications bands under the family of 3GPP wireless communications standards, transceiver circuitry that operates using communications bands under the IEEE 802.XX family of standards, transceiver circuitry that operates using industrial, scientific, and medical (ISM) bands such as an ISM band between around 900 MHz and 950 MHz or other ISM bands below or above 1 GHz, transceiver circuitry that operates using one or more unlicensed bands, transceiver circuitry that operates using one or more bands reserved for emergency and/or public services, and/or any other desired frequency bands of interest. Wireless circuitry 34 may also be used to perform spatial ranging operations if desired.

In NFC links, wireless signals are typically conveyed over a few inches at most. In satellite navigation system links, cellular telephone links, and other long-range links, wireless signals are typically used to convey data over thousands of feet or miles. In WLAN and WPAN links at 2.4 and 5 GHz and other short-range wireless links, wireless signals are typically used to convey data over tens or hundreds of feet. Antenna diversity schemes may be used if desired to ensure that the antennas that have become blocked or that are otherwise degraded due to the operating environment of device 10 can be switched out of use and higher-performing antennas used in their place. Multiple-input and multiple-output (MIMO) schemes and/or carrier aggregation (CA) schemes may be used to boost data rates and wireless performance.

Wireless circuitry 34 may include antennas 40. Antennas 40 may be formed using any suitable antenna types. For example, antennas 40 may include antennas with resonating elements that are formed from patch antenna structures (e.g., shorted patch antenna structures), slot antenna structures, loop antenna structures, stacked patch antenna structures, antenna structures having parasitic elements, inverted-F antenna structures, planar inverted-F antenna structures, helical antenna structures, monopole antennas, dipole antenna structures, Yagi (Yagi-Uda) antenna structures, surface integrated waveguide structures, hybrids of these designs, etc. If desired, one or more of antennas 40 may be cavity-backed antennas. Two or more antennas 40 may be arranged in a phased antenna array if desired (e.g., for conveying centimeter and/or millimeter wave signals within a signal beam formed in a desired beam pointing direction that may be steered/adjusted over time).

Different types of antennas may be used for different bands and combinations of bands. For example, one type of antenna may be used in forming a local wireless link antenna whereas another type of antenna is used in forming a remote wireless link antenna. If desired, space may be conserved within device 10 by using a single antenna to handle two or more different communications bands. If desired, a combination of antennas for covering multiple frequency bands and dedicated antennas for covering a single frequency band may be used. For example, a first antenna 40 in device 10 may be used to handle communications in a WiFi® or Bluetooth® communication band at 2.4 GHz, a GPS L1 band at 1575 MHz, a GPS L5 band at 1176 MHz, and one or more cellular telephone communications bands such as a cellular midband (MB) from 1710 to 2170 MHz, a cellular high band (HB) from 2300 to 2700 MHz, whereas a second antenna 40 in device 10 is used to handle communications in a cellular low band (LB) and the cellular HB.

It may be desirable to implement at least some of the antennas in device 10 using portions of electrical components that would otherwise not be used as antennas and that support additional device functions. As an example, it may be desirable to produce antenna currents in components such as display 14 (FIG. 1), so that display 14 and/or other electrical components (e.g., a touch sensor, near-field communications loop antenna, conductive display assembly or housing, conductive shielding structures, etc.) can serve as part of an antenna for Wi-Fi, Bluetooth, GPS, cellular frequencies, and/or other frequencies without the need to incorporate separate bulky antenna structures in device 10. Conductive portions of housing 12 (FIG. 1) may be used to form part of an antenna ground for one or more antennas 40.

While control circuitry 28 is shown separately from wireless circuitry 34 in the example of FIG. 1 for the sake of clarity, wireless circuitry 34 may include processing circuitry (e.g., one or more processors) that forms a part of processing circuitry 26 and/or storage circuitry that forms a part of storage circuitry 24 of control circuitry 28 (e.g., portions of control circuitry 28 may be implemented on wireless circuitry 34). As an example, control circuitry 28 may include baseband circuitry (e.g., one or more baseband processors), digital control circuitry, analog control circuitry, and/or other control circuitry that forms part of radio wireless circuitry 34. The baseband circuitry may, for example, access a communication protocol stack on control circuitry 28 (e.g., storage circuitry 24) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum layer. If desired, the PHY layer operations may additionally or alternatively be performed by radio-frequency (RF) interface circuitry in wireless circuitry 34.

Figure 3:
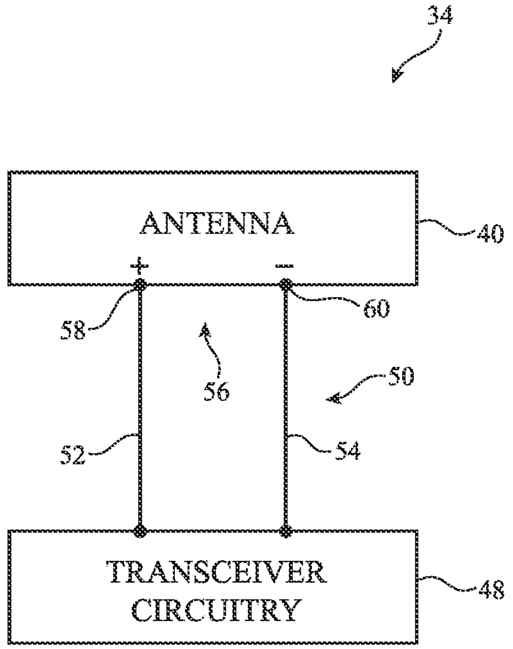
FIG. 3 is a diagram of illustrative wireless circuitry in an electronic device in accordance with some embodiments.

A schematic diagram of wireless circuitry 34 is shown in FIG. 3. As shown in FIG. 3, wireless circuitry 34 may include transceiver circuitry 48 (e.g., cellular telephone transceiver circuitry 36 of FIG. 2, WLAN/WPAN transceiver circuitry 32, etc.) that is coupled to a given antenna 40 using a radio-frequency transmission line path such as radio-frequency transmission line path 50.

To provide antenna structures such as antenna 40 with the ability to cover different frequencies of interest, antenna 40 may be provided with circuitry such as filter circuitry (e.g., one or more passive filters and/or one or more tunable filter circuits). Discrete components such as capacitors, inductors, and resistors may be incorporated into the filter circuitry. Capacitive structures, inductive structures, and resistive structures may also be formed from patterned metal structures (e.g., part of an antenna). If desired, antenna 40 may be provided with adjustable circuits such as tunable components that tune the antenna over communications (frequency) bands of interest. The tunable components may be part of a tunable filter or tunable impedance matching network, may be part of an antenna resonating element, may span a gap between an antenna resonating element and antenna ground, etc.

Radio-frequency transmission line path 50 may include one or more radio-frequency transmission lines (sometimes referred to herein simply as transmission lines). Radio-frequency transmission line path 50 (e.g., the transmission lines in radio-frequency transmission line path 50) may include a positive signal conductor such as signal conductor 52 and a ground signal conductor such as ground conductor 54.

The transmission lines in radio-frequency transmission line path 50 may, for example, include coaxial cable transmission lines (e.g., ground conductor 54 may be implemented as a grounded conductive braid surrounding signal conductor 52 along its length), stripline transmission lines (e.g., where ground conductor 54 extends along two sides of signal conductor 52), a microstrip transmission line (e.g., where ground conductor 54 extends along one side of signal conductor 52), coaxial probes realized by a metalized via, edge-coupled microstrip transmission lines, edge-coupled stripline transmission lines, waveguide structures (e.g., coplanar waveguides or grounded coplanar waveguides), combinations of these types of transmission lines and/or other transmission line structures, etc.

Transmission lines in radio-frequency transmission line path 50 may be integrated into rigid and/or flexible printed circuit boards. In one suitable arrangement, radio-frequency transmission line path 50 may include transmission line conductors (e.g., signal conductors 52 and ground conductors 54) integrated within multilayer laminated structures (e.g., layers of a conductive material such as copper and a dielectric material such as a resin that are laminated together without intervening adhesive). The multilayer laminated structures may, if desired, be folded or bent in multiple dimensions (e.g., two or three dimensions) and may maintain a bent or folded shape after bending (e.g., the multilayer laminated structures may be folded into a particular three-dimensional shape to route around other device components and may be rigid enough to hold its shape after folding without being held in place by stiffeners or other structures). All of the multiple layers of the laminated structures may be batch laminated together (e.g., in a single pressing process) without adhesive (e.g., as opposed to performing multiple pressing processes to laminate multiple layers together with adhesive).

A matching network may include components such as inductors, resistors, and capacitors used in matching the impedance of antenna 40 to the impedance of radio-frequency transmission line path 50. Matching network components may be provided as discrete components (e.g., surface mount technology components) or may be formed from housing structures, printed circuit board structures, traces on plastic supports, etc. Components such as these may also be used in forming filter circuitry in antenna(s) 40 and may be tunable and/or fixed components.

Radio-frequency transmission line path 50 may be coupled to antenna feed structures associated with antenna 40. As an example, antenna 40 may form an inverted-F antenna, a planar inverted-F antenna, a patch antenna, a loop antenna, or other antenna having an antenna feed 56 with a positive antenna feed terminal such as terminal 58 and a ground antenna feed terminal such as terminal 60. Positive antenna feed terminal 58 may be coupled to an antenna resonating (radiating) element within antenna 40. Ground antenna feed terminal 60 may be coupled to an antenna ground in antenna 40. Signal conductor 52 may be coupled to positive antenna feed terminal 58 and ground conductor 54 may be coupled to ground antenna feed terminal 60.

Other types of antenna feed arrangements may be used if desired. For example, antenna 40 may be fed using multiple feeds each coupled to a respective port of transceiver circuitry 48 over a corresponding transmission line. If desired, signal conductor 52 may be coupled to multiple locations on antenna 40 (e.g., antenna 40 may include multiple positive antenna feed terminals coupled to signal conductor 52 of the same radio-frequency transmission line path 50). Switches may be interposed on the signal conductor between transceiver circuitry 48 and the positive antenna feed terminals if desired (e.g., to selectively activate one or more positive antenna feed terminals at any given time). The illustrative feeding configuration of FIG. 3 is merely illustrative.

The term "convey radio-frequency signals" as used herein means the transmission and/or reception of the radio-frequency signals (e.g., for performing unidirectional and/or bidirectional wireless communications with external wireless communications equipment). Antennas 40 may transmit the radio-frequency signals by radiating the radio-frequency signals into free space (or to free space through intervening device structures such as a dielectric cover layer). Antennas 40 may additionally or alternatively receive the radio-frequency signals from free space (e.g., through intervening devices structures such as a dielectric cover layer). The transmission and reception of radio-frequency signals by antennas 40 each involve the excitation or resonance of antenna currents on an antenna resonating element in the antenna by the radio-frequency signals within the frequency band(s) of operation of the antenna.

Device 10 may include multiple antennas that convey radio-frequency signals through different sides of device 10. For example, device 10 may include at least first antenna 40 that conveys radio-frequency signals through the front face of device 10 (e.g., display 14 of FIG. 1) and a second antenna 40 that conveys radio-frequency signals through the rear face of device 10 (e.g., rear housing wall 12R of FIG. 1).

Any desired antenna structures may be used for implementing the antenna 40 that conveys radio-frequency signals through the front face of device 10. In one suitable arrangement that is sometimes described herein as an example, shorted patch antenna structures may be used for implementing the antenna 40 that conveys radio-frequency signals through the front face of device 10. Antennas that are implemented using patch antenna structures may sometimes be referred to herein as patch antennas. Patch antennas that are implemented using shorted patch antenna structures may sometimes be referred to herein as shorted patch antennas. An illustrative shorted patch antenna that may be used to convey radio-frequency signals through the front face of device 10 is shown in FIG. 4.

Figure 4:
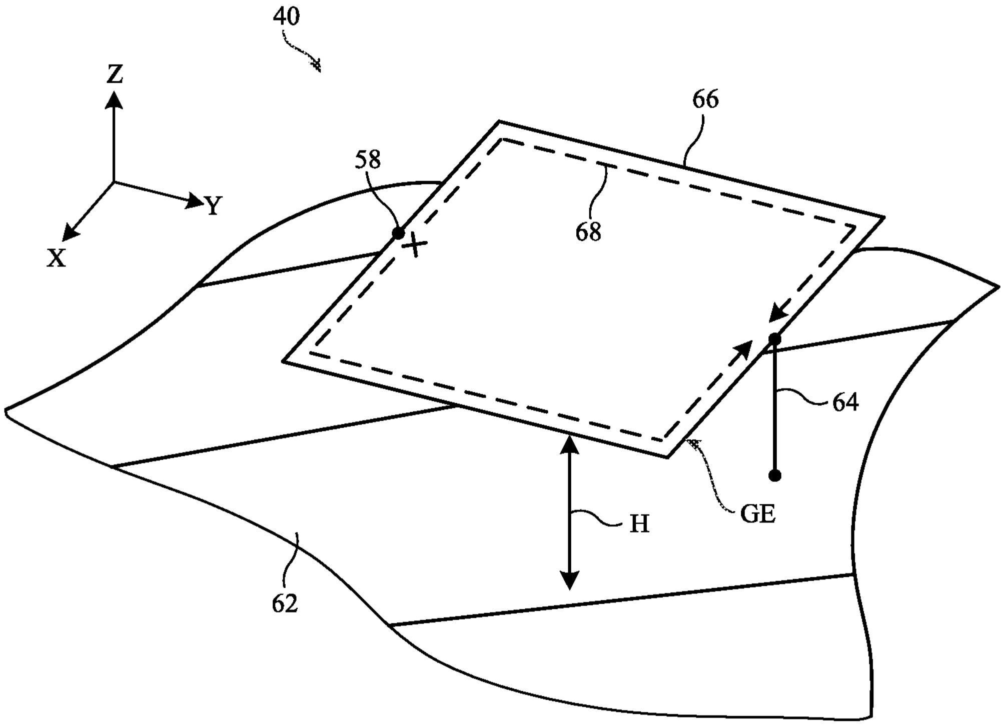
FIG. 4 is a perspective view of an illustrative antenna having a shorted patch element in accordance with some embodiments.

As shown in FIG. 4, antenna 40 may have a radiating patch element such as patch element 66 that is separated from and parallel to an antenna ground such as antenna ground 62 (sometimes referred to herein as ground plane 62 or ground structures 62). Patch element 66 may lie within a plane such as the X-Y plane of FIG. 4 (e.g., the lateral surface area of patch element 66 may lie in the X-Y plane). Patch element 66 may sometimes be referred to herein as patch antenna resonating element 66, patch resonating element 66, patch resonator 66, shorted patch antenna resonating element 66, patch 66, patch radiating element 66, patch antenna radiating element 66, shorted patch antenna radiating element 66, patch radiator 66, antenna resonating element 66, or antenna radiating element 66.

Antenna ground 62 may lie within a plane that is parallel to the plane of patch element 66. Patch element 66 and antenna ground 62 may therefore lie in separate parallel planes that are separated by a distance (height) H. Antenna ground 62 may be formed from conductive traces patterned on a dielectric substrate such as a rigid or flexible printed circuit board substrate, metal foil, stamped sheet metal, electronic device housing structures, or any other desired conductive structures (e.g., ground structures). Patch element 66 may be formed from electronic device housing structures, conductive display structures, and a conductive ring, as one example.

The length of the sides of patch element 66 may be selected so that antenna 40 resonates (radiates) at desired operating frequencies. For example, the sides of patch element 66 may each have a length that is approximately equal to half of the wavelength of the signals conveyed by antenna 40 (e.g., the effective wavelength given the dielectric properties of the materials surrounding patch element 66). Positive antenna feed terminal 58 may be coupled to patch element 66 (e.g., at a feed edge of patch element 66). One or more grounding structures such as grounding structure 64 may couple patch element 66 to antenna ground 62. Grounding structure 64 may, for example, couple a ground edge GE of patch element 66 to antenna ground 62. Ground edge GE may be the edge opposite to the feed edge of patch element 66, for example. Grounding structure 64 may include an integral portion of patch element 66 that is bent or folded towards antenna ground 62, conductive traces, sheet metal, solder, welds, conductive adhesive, conductive foam, metal foil, a conductive portion of the housing of device 10, a conductive spring, a conductive gasket, a conductive bracket, a conductive clip, a conductive prong, a conductive pin, and/or any other desired conductive structures for coupling (e.g., electrically connecting) patch element 66 to antenna ground 62.

Grounding structure 64 may serve to electrically short patch element 66 to antenna ground 62 at the frequencies of operation of antenna 40. Grounding structure 64 may therefore sometimes be referred to as a short path or return path for patch element 66. This may configure antenna 40 to form a type of patch antenna sometimes referred to as a shorted patch antenna. Grounding structure 64 may configure antenna current to flow along the perimeter of patch element 66 as shown by arrow 68. This length may be selected to configure antenna 40 to convey radio-frequency signals within corresponding frequency bands. The antenna current may be produced by positive antenna feed terminal 58 (e.g., during signal transmission) or by incident radio-frequency signals received by antenna 40. During signal reception, the antenna current may pass the radio-frequency signals to transceiver circuitry on device 10 via positive antenna feed terminal 58.

The example of FIG. 4 is merely illustrative. Patch element 66 may have a square shape in which all of the sides of patch element 66 are the same length or may have a different rectangular shape. Patch element 66 may be formed in other shapes having any desired number of straight and/or curved edges (e.g., a round shape, an elliptical shape, a polygonal shape, etc.). Patch element 66 of antenna 40 may be formed from multiple conductive structures in device 10 in a manner that serves to integrate patch element 66 into device 10 in a way that allows antenna 40 to convey radio-frequency signals through the front face of device 10.

Figure 5:
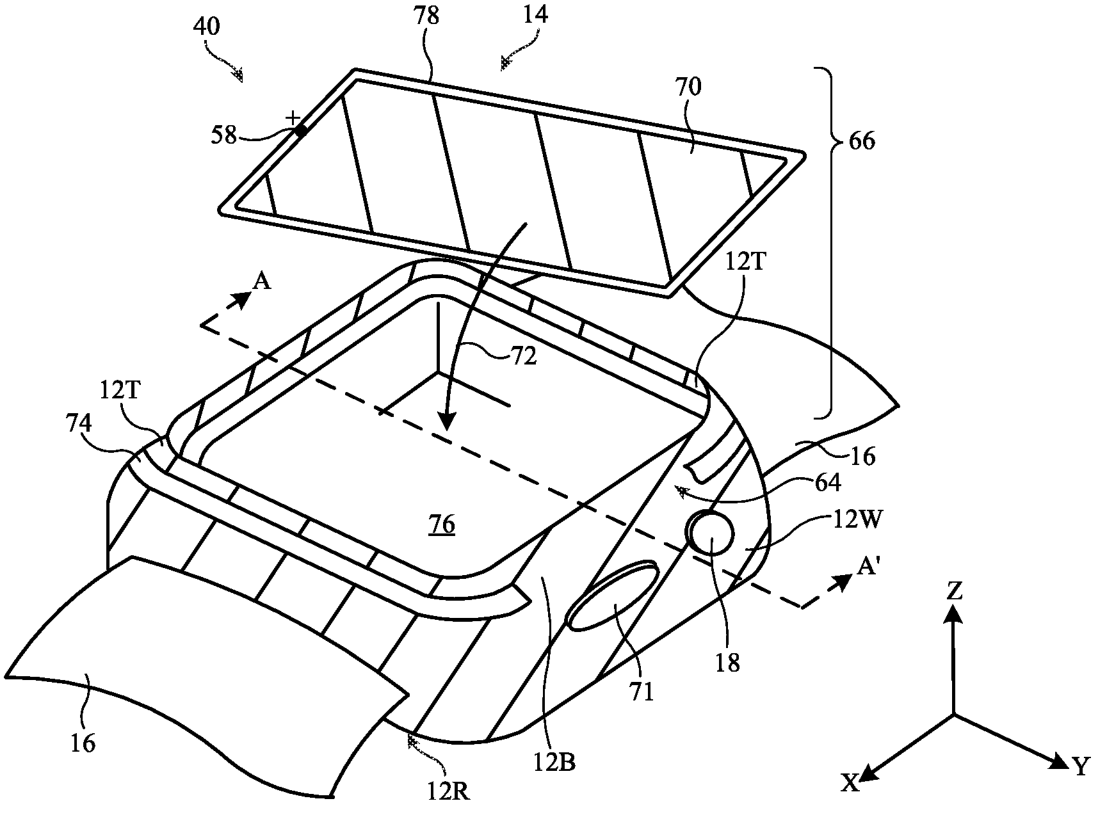
FIG. 5 is a perspective view showing how a shorted patch element of an antenna may be formed from conductive housing structures and display structures within an electronic device in accordance with some embodiments.

FIG. 5 is an exploded perspective view showing how patch element 66 may be formed from multiple conductive structures and integrated into device 10 for conveying radio-frequency signals through the front face of device 10.

In the exploded view of FIG. 5, display 14 has been removed from housing 12 to better illustrate its integration into device 10. As shown in FIG. 5, the housing of device 10 (e.g., housing 12 of FIG. 1) may include conductive housing structures that surround an interior cavity 76 of device 10. The conductive housing structures may include conductive housing sidewalls 12W. Conductive housing sidewalls 12W may run around a lateral periphery of device 10 (e.g., around interior cavity 76). The conductive housing structures may also include a conductive upper portion such as conductive turret 12T. Conductive turret 12T also runs around the lateral periphery of device 10. Conductive turret 12T may sometimes referred to herein as conductive upper portion 12T of housing 12, conductive top portion 12T of housing 12, conductive ring 12T, or conductive bezel 12T.

The housing may include a dielectric-filled slot such as slot 74 that vertically separates conductive turret 12T from conductive housing sidewalls 12W (e.g., that divides the conductive material in housing 12 to separate conductive housing sidewalls 12W from conductive turret 12T). Slot 74 may be filled with injection-molded plastic, ceramic, and/or any other desired dielectric material. Slot 74 may be an elongated slot that extends along one or more of the edges or sides of device 10. Put differently, slot 74 may have a longitudinal axis that extends along one or more edges of device 10. In the example of FIG. 5, slot 74 is a C-shaped or U-shaped slot that extends along (e.g., has a longitudinal axis that extends along) three of the four sides of device 10 and along portions of a fourth side of device 10 (e.g., in an implementation where device 10 has a rectangular housing). More generally (e.g., for implementations where device 10 has a circular or elliptical housing), slot 74 may extend around at least 210, 270, 300, 330, 345, 350, or 210-350 degrees of the housing (e.g., when measured around the Z-axis), as examples.

The conductive structures in housing 12 may also include a conductive bridging portion such as conductive bridge 12B. Conductive bridge 12B couples conductive turret 12T to conductive housing sidewalls 12W at the portion of housing 12 that is not divided by slot 74. In other words, slot 74 extends from a first edge of conductive bridge 12B, around the periphery of device 10, to an opposing second edge of conductive bridge 12B (e.g., conductive bridge 12B bridges slot 74) while vertically separating conductive turret 12T from conductive housing sidewalls 12W. Conductive housing sidewalls 12W and conductive turret 12T may respectively define opposing first and second edges of slot 74 that extend along the length of slot 74. Conductive bridge 12B may, for example, couple conductive turret 12T to conductive housing sidewalls 12W at the fourth side/edge of device 10 having buttons 18 and/or vents 71 (e.g., speaker vents, barometric vents, water release vents, etc.). Conductive bridge 12B may extend across some or all of the fourth edge of device 10 (e.g., 5% of the fourth edge, 10% of the fourth edge, 10-50% of the fourth edge, 25-75% of the fourth edge, more than 50% of the fourth edge, 50-90% of the fourth edge, 100% of the fourth edge, etc.). If desired, conductive turret 12T, conductive bridge 12B, and conductive housing sidewalls 12W may be formed from integral portions of a single piece of machined metal to maximize the mechanical strength and aesthetic characteristics of device 10 (e.g., in a unibody configuration).

As shown in FIG. 5, display 14 may include conductive display structures 70. Conductive display structures 70 may include conductive material in a display board for display 14

(sometimes referred to herein as a display module). The display board may include a main logic board (MLB) for the display. The display board may have control electronics (e.g., display drivers), control lines (traces), power lines (traces), ground lines (traces), and other conductive structures on a dielectric substrate (e.g., a rigid or flexible printed circuit substrate). If desired, conductive display structures 70 may additionally or alternatively include a conductive display frame (e.g., a frame for the display board), conductive shielding structures (e.g., shielding cans for one or more of the components on the display board), conductive adhesive, conductive pixel circuitry for display 14, touch sensor electrodes for display 14, an embedded near-field communications antenna within display 14 or on or in the display board, etc.

Display 14 may also include a conductive ring such as conductive ring 78. Conductive ring 78 may be mounted to (under) conductive display structures 70. Conductive ring 78 may extend around some or all of the lateral periphery of conductive display structures 70. Conductive ring 78 may be formed from a metal such as stainless steel (e.g., a stamped sheet metal member). Conductive ring 78 may be welded to conductive display structures 70, soldered to conductive display structures 70, and/or coupled to conductive display structures 70 using conductive adhesive. In this way, conductive ring 78 and conductive display structures 70 may electrically form a single unitary conductive structure. Conductive ring 78 may sometimes be referred to herein as wave ring 78.

When device 10 is assembled, display 14 may be mounted to conductive turret 12T, as shown by arrow 72. Conductive ring 78 may be electrically and mechanically coupled to conductive turret 12T (e.g., along the peripheral edges of conductive ring 78). Conductive adhesive, welds, solder, and/or any other desired conductive interconnect structures may be used to mechanically and electrically couple conductive ring 78 to conductive turret 12T. Conductive ring 78 may serve to electrically connect the periphery (e.g., the entire periphery) of conductive display structures 70 to conductive turret 12T. In this way, when device 10 is fully assembled, conductive ring 78, conductive display structures 70, and conductive turret 12T may collectively form a single electrical structure (e.g., a unitary conductive structure) that forms patch element 66 of antenna 40.

Positive antenna feed terminal 58 may be coupled to conductive display structures 70 and/or conductive ring 78. The dielectric material in slot 74 may serve to electrically separate conductive patch element 66 (e.g., conductive ring 78, conductive display structures 70, and conductive turret 12T) from the antenna ground in antenna 40 (e.g., antenna ground 62 of FIG. 4). The antenna ground may be formed from conductive housing sidewalls 12W, conductive portions of rear housing wall 12R, and/or grounded structures within interior cavity 76 (e.g., ground traces, conductive housing structures, conductive portions of one or more components disposed within interior cavity 76, etc.). Conductive bridge 12B may couple patch element 66 (e.g., conductive ring 78, conductive display structures 70, and conductive turret 12T) to the antenna ground (e.g., to conductive housing sidewalls 12W). Conductive bridge 12B may therefore form grounding structure 64 for patch element 66 and antenna 40. Positive antenna feed terminal 58 may, for example, be coupled to patch element 66 at the side of device 10 opposite to conductive bridge 12B. When antenna 40 conveys radio-frequency signals, antenna currents run along the periphery of patch element 66 (e.g., along conductive turret 12T).

Integrating antenna 40 into display 14 and device 10 in this way may allow antenna 40 to convey radio-frequency signals through the front face of device 10 while extending the radiating area (volume) of antenna 40 to include essentially all of the lateral area available within device 10. This may serve to maximize the bandwidth of antenna 40 for covering multiple frequency bands of interest (e.g., including both the GPS L1 and GPS L5 bands in addition to the cellular HB).

In other implementations, the radiating edge of the patch element is defined by a slot that lies within the planar front face of display 14 (e.g., in the X-Y plane). In these implementations, display 14 needs to include an inactive area around its periphery overlapping the slot to allow the antenna to radiate properly. The presence of the inactive area limits both the antenna volume and the size of the active area of display 14 available for pixel circuitry that displays images to a user, thereby limiting the size of images viewable by the user. By moving the slot and thus the radiating edge of patch element 74 into the peripheral sides of device 10 (e.g., by forming slot 74 within the periphery of device 10 rather than within the plane of the front face of device 10), the inactive area for display 14 can be reduced or eliminated, thereby maximizing the size of the active area on display 14 available for pixel circuitry that displays images and thus the size of the images viewable by the user.

Figure 6:
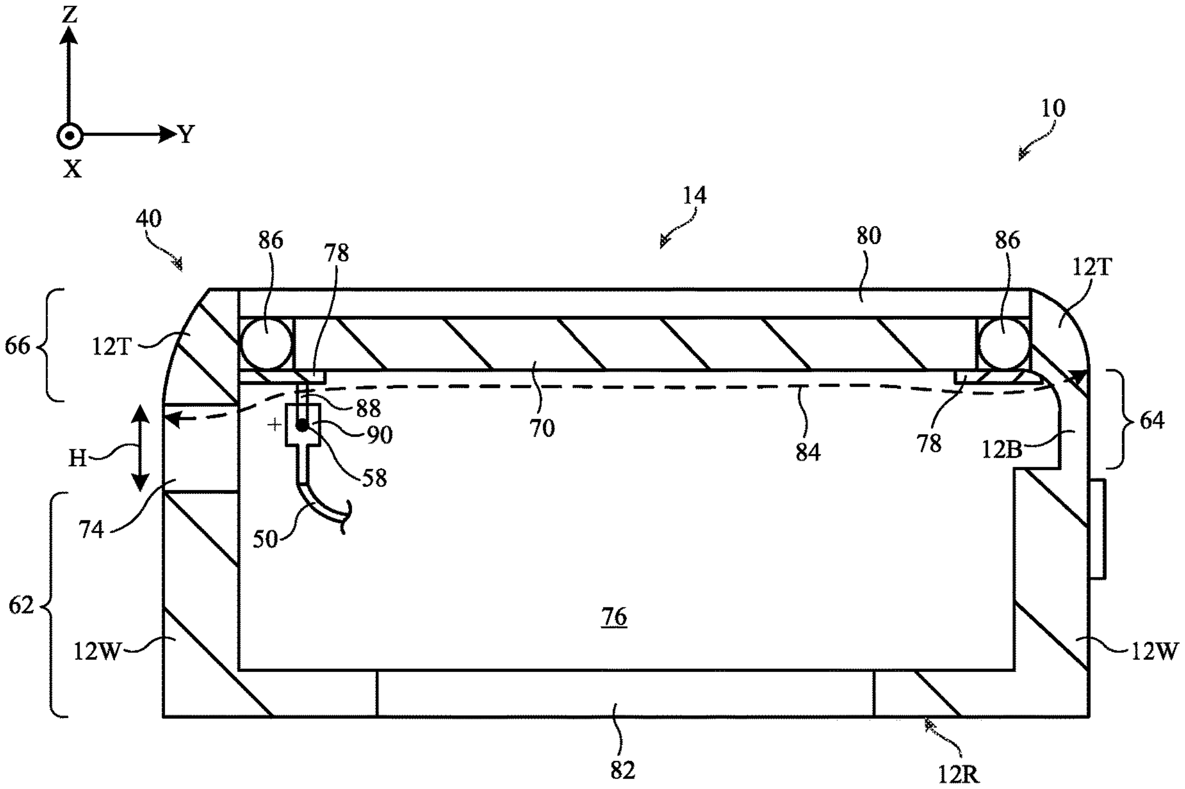
FIG. 6 is a cross-sectional side view of an illustrative electronic device having an antenna with a shorted patch element formed from conductive housing structures and display structures in accordance with some embodiments.

FIG. 6 is a cross-sectional side view showing how antenna 40 may be integrated into device 10 when fully assembled (e.g., as taken along line AA of FIG. 5). As shown in FIG. 6, conductive housing sidewalls 12W of device 10 may extend from the rear face of device 10 (rear housing wall 12R) towards the front face of device 10. Rear housing wall 12R may include conductive portions and may include a dielectric portion 82. The conductive portions of rear housing wall 12R and conductive housing sidewalls 12W may be formed from integral portions of a single integrated piece of metal, if desired. Dielectric portion 82 may include glass, sapphire, ceramic, or other dielectric materials that forms an antenna window for an additional antenna in device 10 that conveys radio-frequency signals through the rear face of device 10 and/or that allows sensor signals to pass through the rear face of device 10.

Conductive housing sidewalls 12W may be coupled to conductive turret 12T by conductive bridge 12B. Display 14 may include a display cover layer 80 layered onto conductive display structures 70. Conductive display structures 70 may be mounted to conductive ring 78 (e.g., conductive ring 78 may be layered under conductive display structures 70). Conductive adhesive, solder, welds, and/or any other desired conductive interconnect structures may couple conductive ring 78 to conductive display structures 70.

When display 14 is mounted to device 10 (as shown in FIG. 6), conductive ring 78 is mounted to conductive turret 12T. Conductive adhesive, solder, welds, and/or any other desired conductive interconnect structures may couple conductive ring 78 to conductive turret 12T. Conductive turret 12T may extend around the lateral periphery of display cover layer 80 and may help hold display cover layer 80 in place. Conductive turret 12T may therefore form a conductive bezel for display 14 and display cover layer 80. In other implementations, display cover layer 80 may be mounted to a top surface of conductive turret 12T (e.g., using adhesive) if desired. In this way, conductive display structures 70, conductive ring 78, and conductive turret 12T may form patch element 66 for antenna 40.

A dielectric sealant such as dielectric gasket 86 may be laterally interposed between the peripheral edges of conductive display structures 70 and conductive turret 12T. Dielectric gasket 86 may be vertically interposed between display cover layer 80 and conductive ring 78. Dielectric gasket 86 may include polymer, foam, rubber, plastic, or any other dielectric materials. Dielectric gasket 86 may laterally extend around the periphery of conductive display structures 70 (e.g., within the X-Y plane). Dielectric gasket 86 may serve to form a water-tight and airtight seal between interior cavity 76 and the exterior of device 10, may help to secure display 14 to device 10, and/or may help to provide mechanical integrity (e.g., shock absorption) for device 10.

Positive antenna feed terminal 58 may be coupled to display 14 (e.g., conductive display structures 70 and/or conductive ring 78). As one example, display 14 may include a conductive prong 88 (sometimes referred to herein as conductive tab 88 or conductive spring finger 88) that is electrically coupled to conductive ring 78, conductive display structures 70, and/or conductive turret 12T. Radio-frequency transmission line path 50 may be coupled to conductive prong 88 using conductive clip 90, thereby forming positive antenna feed terminal 58 for antenna 40. This is merely illustrative and, in general, any desired structures may be used to couple radio-frequency transmission line path 50 to positive antenna feed terminal 58.

Conductive housing sidewalls 12W and conductive portions of rear housing wall 12R may form antenna ground 62 for antenna 40. Conductive material within interior cavity 76 (not shown) may also form part of antenna ground 62. Slot 74 may vertically separate conductive turret 12T and thus patch element 66 from conductive housing sidewall 12W and thus antenna ground 62 (e.g., along three of the lateral sides of device 10). Slot 74 may have a height (width) H that is selected to tune the response of antenna 40. Conductive bridge 12B and thus grounding structure 64 may couple conductive turret 12T to conductive housing sidewalls 12W (e.g., at the side of device 10 opposite positive antenna feed terminal 58). When antenna 40 conveys radio-frequency signals, corresponding antenna currents may flow across patch element 66 (e.g., conductive turret 12T, conductive ring 78, and conductive display structures 70) as shown by arrow 84. When integrated into device 10 in this way, the antenna current flow across all of the lateral area of device 10, thereby maximizing antenna performance and allowing for display 14 to exhibit as large an active display area as possible for displaying images through display cover layer 80.

Figure 7:
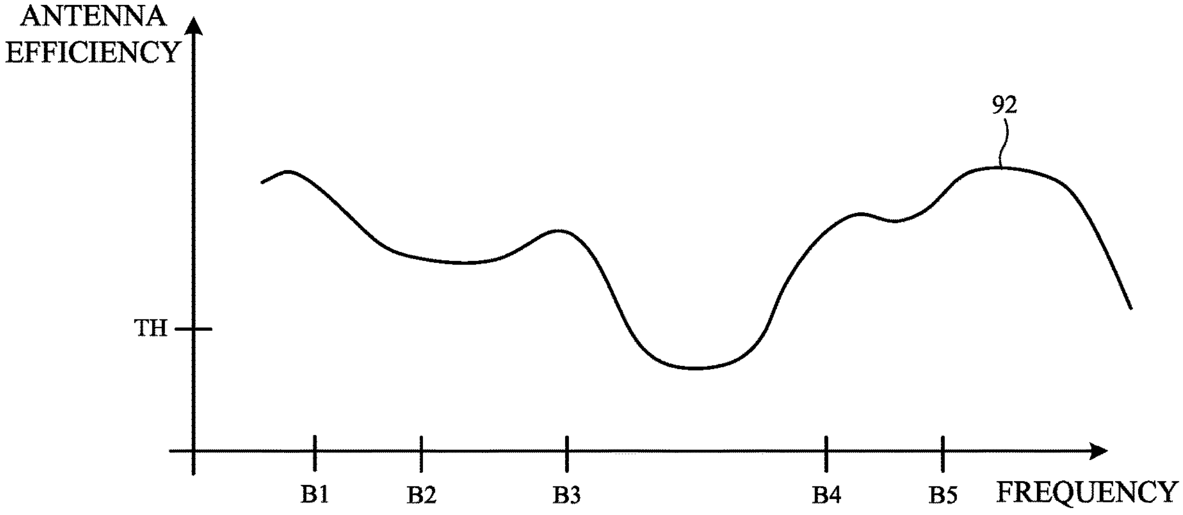
FIG. 7 is a plot of antenna performance (antenna efficiency) as a function of frequency for an illustrative antenna of the type shown in FIGS. 2-6 in accordance with some embodiments.

FIG. 7 is a plot of antenna efficiency as a function of frequency for antenna 40 of FIGS. 2-6. As shown by curve 92 of FIG. 7, antenna 40 may exhibit a relatively broad frequency response (e.g., due to its large area as integrated into device 10). Antenna 40 may, for example, exhibit satisfactory antenna efficiency (e.g., antenna efficiency that exceeds threshold efficiency value TH) within each of frequency bands B1, B2, B3, B4, and B5. Band B1 may be, for example, the GPS L5 band. Band B2 may be, for example, the GPS L1 band. Band B3 may be, for example, the cellular MB. Band B4 may be, for example, the 2.4 GHz WLAN/WPAN band. Band B5 may be, for example, the cellular HB. The example of FIG. 7 is merely illustrative. Curve 92 may have other shapes in practice and bands B1, B2, B3, B4, and B5 may be at any desired frequencies.

Device 10 may gather and/or use personally identifiable information. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing is merely illustrative and various modifications can be made to the described embodiments. The foregoing embodiments may be implemented individually or in any combination.

What is claimed is:

1. An electronic device comprising:

a housing having conductive sidewalls, a conductive turret, and a conductive bridge;

a slot that separates the conductive sidewalls from the conductive turret, wherein the conductive bridge couples the conductive turret to the conductive sidewalls across the slot;

a display mounted to the conductive turret and having conductive structures; and an antenna having a patch element formed from the conductive turret and the conductive structures and having an antenna ground that includes the conductive sidewalls.

2. The electronic device of claim 1, wherein the display comprises a display board and the conductive structures comprise conductive material on the display board.

3. The electronic device of claim 2, wherein display comprises a conductive ring that forms part of the patch element, the conductive ring being mounted to the display board and extending around a periphery of the display board.

4. The electronic device of claim 3, wherein the conductive ring couples the display board to the conductive turret.

5. The electronic device of claim 4, wherein the display comprises a display cover layer overlapping the display board, the conductive turret extending around a periphery of the display cover layer.

6. The electronic device of claim 5, further comprising a dielectric gasket vertically interposed between the display cover layer and the conductive ring and laterally interposed between the display board and the conductive turret.

7. The electronic device of claim 6, further comprising a positive antenna feed terminal coupled to the display.

8. The electronic device of claim 7, further comprising a conductive tab coupled to the display, a radio-frequency transmission line path, and a conductive clip that couples the radio-frequency transmission line path to the conductive tab at the positive antenna feed terminal.

9. The electronic device of claim 1, further comprising:

a positive antenna feed terminal coupled to the display at a first side of the electronic device, wherein the conductive bridge is at a second side of the electronic device opposite the first side of the electronic device.

10. The electronic device of claim 9, wherein the slot extends along at least three sides of the electronic device.

11. The electronic device of claim 10, wherein the conductive turret, the conductive sidewalls, and the conductive bridge are formed from respective integral portions of a single piece of metal.

12. The electronic device of claim 11, further comprising: a wrist strap attached to the conductive sidewalls.

13. The electronic device of claim 1, wherein the conductive bridge electrically connects the conductive sidewalls to the conductive turret.

14. The electronic device of claim 13, wherein the slot vertically separates the conductive sidewalls from the conductive turret.

15. The electronic device of claim 1, wherein the display includes a display board and the display board includes the conductive structures.

16. The electronic device of claim 15, wherein the conductive turret comprises a ring of metal that laterally surrounds the display board.

17. The electronic device of claim 16, wherein the display comprises a conductive ring that is mounted to the display panel and that electrically couples the conductive structures to the ring of metal, the conductive ring forming part of the patch element.

18. The electronic device of claim 1, wherein the patch element has edges defined by the slot.

19. The electronic device of claim 18, wherein the slot has an elongated length extending from a first end to a second end, the conductive bridge being interposed between the first end and the second end of the slot.

20. The electronic device of claim 19, wherein the slot has a first edge that defines the edges of the patch element and has a second edge that extends along the conductive sidewalls, the first and second edges extending from the first end of the slot to the second end of the slot.

* * * * *